United States Patent
Hayashida et al.

(10) Patent No.: US 7,513,829 B2
(45) Date of Patent: Apr. 7, 2009

(54) GAME MACHINE AND GAME PROGRAM FOR RENDERING A MARK IMAGE OF A PLAYER CHARACTER WHICH MAY BE HIDDEN BEHIND AN OBJECT

(75) Inventors: Koichi Hayashida, Kyoto (JP); Yoshiaki Koizumi, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1188 days.

(21) Appl. No.: 10/262,660

(22) Filed: Oct. 2, 2002

(65) Prior Publication Data

US 2003/0166413 A1 Sep. 4, 2003

(30) Foreign Application Priority Data

Apr. 3, 2002 (JP) .............................. 2002-101257

(51) Int. Cl.
*A63F 9/24* (2006.01)

(52) U.S. Cl. ........................................ 463/30
(58) Field of Classification Search .................. 463/31, 463/32, 47, 53, 30; 345/422
See application file for complete search history.

(56) References Cited

U.S. PATENT DOCUMENTS

| | | | | |
|---|---|---|---|---|
| 5,854,631 A | * | 12/1998 | Akeley et al. | ................ 345/419 |
| 5,880,709 A | * | 3/1999 | Itai et al. | ..................... 345/629 |
| 6,017,272 A | * | 1/2000 | Rieder | ......................... 463/31 |
| 6,280,323 B1 | * | 8/2001 | Yamazaki et al. | .............. 463/4 |
| 6,335,731 B1 | | 1/2002 | Yamamoto | |
| 2001/0011036 A1 | * | 8/2001 | Miyamoto et al. | ............ 463/32 |
| 2001/0049300 A1 | * | 12/2001 | Okamoto et al. | ............. 463/30 |
| 2003/0063087 A1 | * | 4/2003 | Doyle et al. | ................ 345/422 |

FOREIGN PATENT DOCUMENTS

EP 0786742 A1 * 7/1991

(Continued)

OTHER PUBLICATIONS

Mintz, "The EFnet #OpenGL FAQ—Revision Mar. 11, 2000", pp. 1-28, www.geocities.com/SiliconValley/Park/5625/opengl/.

(Continued)

*Primary Examiner*—John M Hotaling, II
*Assistant Examiner*—Dat Nguyen
(74) *Attorney, Agent, or Firm*—Nixon & Vanderhye P.C.

(57) ABSTRACT

A game machine includes a CPU, and the CPU renewably determines positions of a player character and a virtual camera in a game space in response to an operation of a controller by a player. Furthermore, a game image produced by the CPU and a GPU is displayed on a monitor. Then, a specific-shaped first mark image to inform the player a presence of the player character is rendered by the CPU and the GPU on images of a building object and a wall object in the game image.

9 Claims, 12 Drawing Sheets

FOREIGN PATENT DOCUMENTS

| | | |
|---|---|---|
| EP | 0 786 742 | 7/1997 |
| EP | 0943362 A2 * | 9/1999 |
| EP | 1 052 000 | 11/2000 |
| EP | 1 217 586 | 6/2002 |
| JP | 07-008632 | 1/1995 |
| JP | 07-008632 * | 2/1999 |
| JP | 2000-140416 | 5/2000 |
| JP | 2002-045566 | 2/2002 |

OTHER PUBLICATIONS

Peers, "Interacting with Ray Traces", Ray Tracing News, Jan. 18, 1996, pp. 1-26, www.jedi.ks.uiuc.edu/{johns/raytracer/rtn/rtnv9n1.html, pp. 1-26.

Foley et al., "Computer Graphics Principles and Practice", Addison Wesley, Reading, U.S., 1997, pp. 649-717, XP-002304412.

* cited by examiner

GAME MACHINE AND GAME PROGRAM FOR RENDERING A MARK IMAGE OF A PLAYER CHARACTER WHICH MAY BE HIDDEN BEHIND AN OBJECT

BACKGROUND

1. Field

Non-Limiting exemplary embodiments of the technology described below relates to a game machine and a game program. More specifically, non-limiting exemplary embodiments of the present invention relates to a game machine and game program for displaying a three-dimension image produced by looking down at game characters (player character, enemy character, item and etc.) and geometry objects (land object, building object and etc.) existing in a game space by a virtual camera.

2. Description of Prior Art

Conventionally, there are some games such as an action game in which a character moves in a game space in response to an operation of a controller by a player. In such a game, a player character and geometry objects (wall, building and etc.) in the game space are displayed as a three-dimension (3D) image photographed by a virtual camera provided in the game space. The virtual camera displays the player character all the time on the game screen, moving together with the player character in response to an operation of the player. In such the game, when the player character moving in response to the operation by the player turns around the geometry object up to a backside thereof arranged in the game space, there is a case that the player character hides behind the geometry object. At this time, in a conventional game, as soon as the player character hides behind the geometry object, by turning the virtual camera around the geometry object up to the backside thereof, the player character is displayed. Alternatively, when the player character hides behind the geometry object, the player character itself is visually displayed by making the geometry object itself translucent without turning the virtual camera around.

However, in a case of immediately turning the virtual camera around, the turn-around causes differences in position and direction of the virtual camera between a previous state and a current state. Therefore, there is a problem that the player cannot grasp a direction to which the player character is advanced and thus becomes puzzled in operating the controller.

Furthermore, other problems are that in a case of making the geometry object itself translucent, the background besides the player character is also visualized, and the geometry object at the front side of the player character is practically nought. Therefore, an interest as a game is decreased. Other problems that are that the translucency of the geometry object causes a need to render and move with reality, in the same manner as the player can view, the enemy character which is essentially at the backside of the geometry object and need not to be rendered.

SUMMARY OF NON-LIMITING EXEMPLARY EMBODIMENTS OF THE INVENTION

Therefore, it is one aspect of non-limiting exemplary embodiments of the present invention to provide a novel video game machine and a game program.

Another aspect of non-limiting exemplary embodiments of the present invention is to provide a video game machine and a game program without reducing operability by a player.

Another aspect of non-limiting exemplary embodiments of the present invention is to provide a video game machine and a game program without increasing load of processing.

A first non-limiting exemplary embodiment of the present invention is a game machine for displaying at least a geometry object and a player character in a game space on the basis of a virtual camera arranged in the game space, comprising: a position determination mechanism for determining positions of the player character and the virtual camera in the game space in response to an operation of the player; a game image producing mechanism for producing a game image in which the geometry object and the player character are viewed from the virtual camera at a determined position; and a first mark image rendering mechanism for rendering a first mark image on an image of the geometry object in the game image so that at least a position of the player character can be known when the player character hides behind the geometry object.

A second non-limiting exemplary embodiment of the present invention is a game machine for displaying at least a geometry object and a player character in a game space on the basis of a virtual camera arranged in the game space, comprising: a position determination mechanism for determining positions of the player character and the virtual camera in the game space in response to an operation of the player; a geometry object rendering mechanism for rendering the geometry object by a geometry object image in a frame buffer while writing depth information from the virtual camera to the geometry object into a Z buffer; a first mark image rendering mechanism for rendering the player character by a first mark image in the frame buffer without rewriting the depth information of the Z buffer; and a player character rendering mechanism for rendering the player character by a player character image in the frame buffer while rewriting the depth information of the Z buffer when the player character is closer to the side of the virtual camera than that of the geometry object with referring to the depth information of the Z buffer.

A third non-limiting exemplary embodiment of the present invention is a game machine for displaying at least a geometry object and a player character in a game space on the basis of a virtual camera arranged in the game space, comprising: a position determination mechanism for determining positions of the player character and the virtual camera in the game space in response to an operation of the player; a game image producing mechanism for producing a game image in which the geometry object and the player character are viewed from the virtual camera at a determined position; a first determination mechanism for determining whether or not the player character hides behind the geometry object; and a first mark image rendering mechanism for rendering a first mark image indicative at least a position of the player character on an image of the geometry object in the game image in response to the determination of the first determination mechanism.

In a case the geometry object includes a building object indicative of at least a building or wall in the game space, the first mark image rendering mechanism renders the first mark image on the building object image in the game image when the player character hides behind the building object.

It is noted that the first mark image includes a specific-shaped first symbol image, and the first symbol image has the same or similar to the player character in shape and different from the player character in texture.

The game machine is capable of further comprising an arrangement mechanism for arranging at least one of an enemy character and an item in the game space, a second determination mechanism for determining whether or not at least one of the enemy character and the item hides behind the geometry object, and a second mark image rendering mechanism for rendering a second mark image indicative of at least a position of at least one of the enemy character and the item on the geometry object image in the game image in response to a determination of the second determination mechanism.

In this case, a color tone changing mechanism for changing a color tone of the second mark image depending on distance from the player character to at least one of the enemy character and the item may be provided.

However, the color tone changing mechanism changes the color tone of the second mark image such that the further the distance from the player character to at least one of the enemy character and the item is, the lighter the color tone of the second mark image is.

It is noted that the second mark image may be a specific-shaped second symbol image.

The game machine may further comprise a third mark image rendering mechanism for rendering a third mark image indicative of a predetermined range of the land at a player character's feet when the first mark image is rendered by the first mark image rendering mechanism.

When the geometry object includes the land object indicative of a land or floor, the third mark image rendering mechanism renders the third mark image at a position of the land object of the player character's feet.

It is noted that the third mark image includes a specific-shaped third symbol image and may be an image having color tone changed depending on distances from the player character's feet.

A fourth aspect of non-limiting exemplary embodiments of the present invention is a game program to make a game machine which displays at least a geometry object and a player character in a game space on the basis of a virtual camera arranged in the game space execute following steps of: a position determination step determining positions of the player character and the virtual camera in the game space in response to an operation of the player; a game image producing step producing a game image in which the object and the player character are viewed from the virtual camera at a determined position; and a first mark image rendering step rendering a first mark image on an image of the geometry object in the game image such that at least a position of the player character can be known when the player character hides behind the geometry object.

A fifth aspect of non-limiting exemplary embodiments of the present invention is a game program to make a game machine which displays at least a geometry object and a player character in a game space on the basis of a virtual camera arranged in the game space execute following steps of: a position determination step determining positions of the player character and the virtual camera in the game space in response to an operation of the player; a geometry object rendering step rendering the geometry object by a geometry object image in a frame buffer while writing depth information from the virtual camera to the geometry object into a Z buffer; a first mark image rendering step rendering the player character by a first mark image in the frame buffer without rewriting the depth information of the Z buffer; and a player character rendering step rendering the player character by the player character image in the frame buffer while rewriting the depth information of the Z buffer when the player character is closer to the side of the virtual camera than that of the geometry object with referring to the depth information of the Z buffer.

A sixth aspect of non-limiting exemplary embodiments of the present invention is a game program to make a game machine which displays at least a geometry object and a player character in a game space on the basis of a virtual camera arranged in the game space execute following steps of: a position determination step determining positions of the player character and the virtual camera in the game space in response to an operation of the player; a game image producing step producing a game image in which the object and the player character are viewed from the virtual camera at a determined position; a first determination step determining whether or not the player character hides behind the geometry object; and a first mark image rendering step rendering a first mark image indicative at least a position of the player character on an image of a geometry object in the game image in response to the determination of the first determination step.

In the first and third non-limiting exemplary embodiments of the present invention, the position determination mechanism includes a CPU 36 shown in FIG. 2 in the embodiment and corresponds to steps S7 and S9 shown in FIG. 4. Then, the position determination mechanism renewably determines the positions of the player character and the virtual camera in the game space in response to the operation of the controller by the player or the user. Furthermore, the game image producing mechanism includes the CPU 36 and a GPU 42, and a step S17 (FIG. 4) in this embodiment. The game image produced by the game image producing mechanism is accumulated in a frame buffer 48, and a video I/F 56 accesses the frame buffer according to an instruction from the CPU 36, so that the game image on a monitor 34 is displayed.

The first mark rendering mechanism corresponds to the CPU 36, the GPU 42 and steps S53 and S55 shown in FIG. 8 in the embodiment, and renders the specific-shaped first mark image on the images of the building object or the wall object in the game image so as to inform the game player of presence of the player character.

Specifically, in the third non-limiting exemplary embodiment of the present invention, the CPU 36 forms the first determination mechanism together with a step S51 shown in FIG. 8, and the first determination mechanism determines whether or not in a situation that the player character hides behind the geometry object such as the building object, the wall object and etc. by executing a so-called Z test. Then, in the third non-limiting exemplary embodiment of the present invention, unlike the first non-limiting exemplary embodiment of the present invention, when the first determination mechanism determines so, the above-described first mark image rendering mechanism renders the first mark.

It is noted that the arrangement mechanism corresponding to the CPU 36 in the embodiment arranges the enemy character and/or the item in the game space. Then, the second determination mechanism corresponding to a step S57 shown in FIG. 8 determines whether or not at least one of the enemy character and the item exists at the backside of the geometry object. In a case the second determination mechanism determines so, the second mark image rendering mechanism corresponding to the CPU 36 and steps S59 to S65 renders the second mark image to indicate at least a position (presence) of at least one of the enemy character and the item on the image of the geometry object (building object, wall object and etc.) in the game image. Although the second mark image may be a specific-shaped symbol, it is preferable that the second mark image is rendered such that the further the distance from the player character to the enemy character and/or the item is, the lighter the color tone is.

It is noted that the third mark image rendering mechanism corresponding to steps S67 and S69 in the embodiment renders the third mark image so as to indicate a player character's feet in a state where the player character exists at the backside of the geometry object on the land object.

Also in the second non-limiting exemplary embodiment, the position determination mechanism includes the CPU 36 shown in FIG. 2 and corresponds to the steps S7 and S9 shown in FIG. 4 in the embodiment, and renewably determines positions of the player character and the virtual camera in the game space in response to the operation of the controller by the player. The geometry object rendering mechanism includes the CPU 36 and the GPU 42 and corresponds to a step S31 shown in FIG. 6 in the embodiment. The geometry object rendering mechanism renders a texture of the geometry object in the frame buffer in a step S43 shown in FIG. 7 and renews (stores) the depth information of the Z buffer in a step S45.

Also in the second non-limiting exemplary embodiment, the first mark image rendering mechanism corresponds to the CPU 36 and the GPU 42, and the steps S53 and S55 shown in FIG. 8 in the embodiment, and renders a specific-shaped first mark image in the frame buffer. Herein, specifically, by ignoring the depth information of the Z buffer, i.e., without renewing it, the texture of the first mark image is written to the frame buffer in the step S55 (FIG. 8). Furthermore, the player character rendering mechanism in the second non-limiting exemplary embodiment includes the CPU 36 and the GPU 42 and corresponds to a step S35 shown in FIG. 6 in the embodiment. When the player character is at the front side of the geometry object (side of the virtual camera) at a time of referring to the Z buffer in a step S73, the player character rendering mechanism renders the texture of the player character in the frame buffer in a step S79 while renewing the depth information of the Z buffer in a step S77.

Thus, it is possible to display a state that one half of the player character can be viewed and other half is at the backside of the geometry object.

Then, in either of the first to third non-limiting exemplary embodiments, the arrangement mechanism corresponding to the CPU 36 in the embodiment arranges the enemy character and/or the item in the game space. The second determination mechanism corresponding to the step S57 shown in FIG. 8 determines whether or not at least one of the enemy character and the item is at the backside of the geometry object. If the second determination mechanism determines so, the second mark image rendering mechanism corresponding to the CPU 36 and the steps S59 to S65 renders the second mark image to indicate a position (presence) of at least one of the enemy character and the item on the geometry object (building object and wall object) image in the game image. Although the second mark image may be a specific-shaped symbol, it is preferable that the second mark image is rendered such that the further the distance from the player character to the enemy character and/or the item is, the lighter the color tone is.

It is noted that the third mark image rendering mechanism corresponding to the steps S67 and S69 in the embodiment renders the third mark image at a position of the player character's feet in a state where the player character exists at the backside of the geometry object on the land object.

According to non-limiting exemplary embodiments of the present invention, in state where the player character is at the backside of the geometry object, the first mark image is first rendered on the geometry object, so that it is possible to inform the player of the position of the player character at the backside of the geometry object and it is possible to inform the player that the player character hides behind the geometry object. Thus, it is possible to enable the player to perform the operation thereafter with less bewilderment than a prior art which is capable of quickly performing a turn-around process of the virtual camera, and therefore, the player doesn't have uncomfortable feeling when operating. Furthermore, it is possible to easily operate one's player character in an area invisible to the player, and therefore, it is possible to provide a unmatched interesting game. In addition, there is no need to render the backside of the geometry object in which the player character hides, and therefore, it is possible to make the load of processing less than that in a prior art capable of making the geometry object translucent.

The above described objects and other objects, features, aspects and advantages of non-limiting exemplary embodiments of the present invention will become more apparent from the following detailed description of the present invention when taken in conjunction with the accompanying drawings.

DETAILED DESCRIPTION OF NON-LIMITING EXEMPLARY EMBODIMENTS

Figure 1:
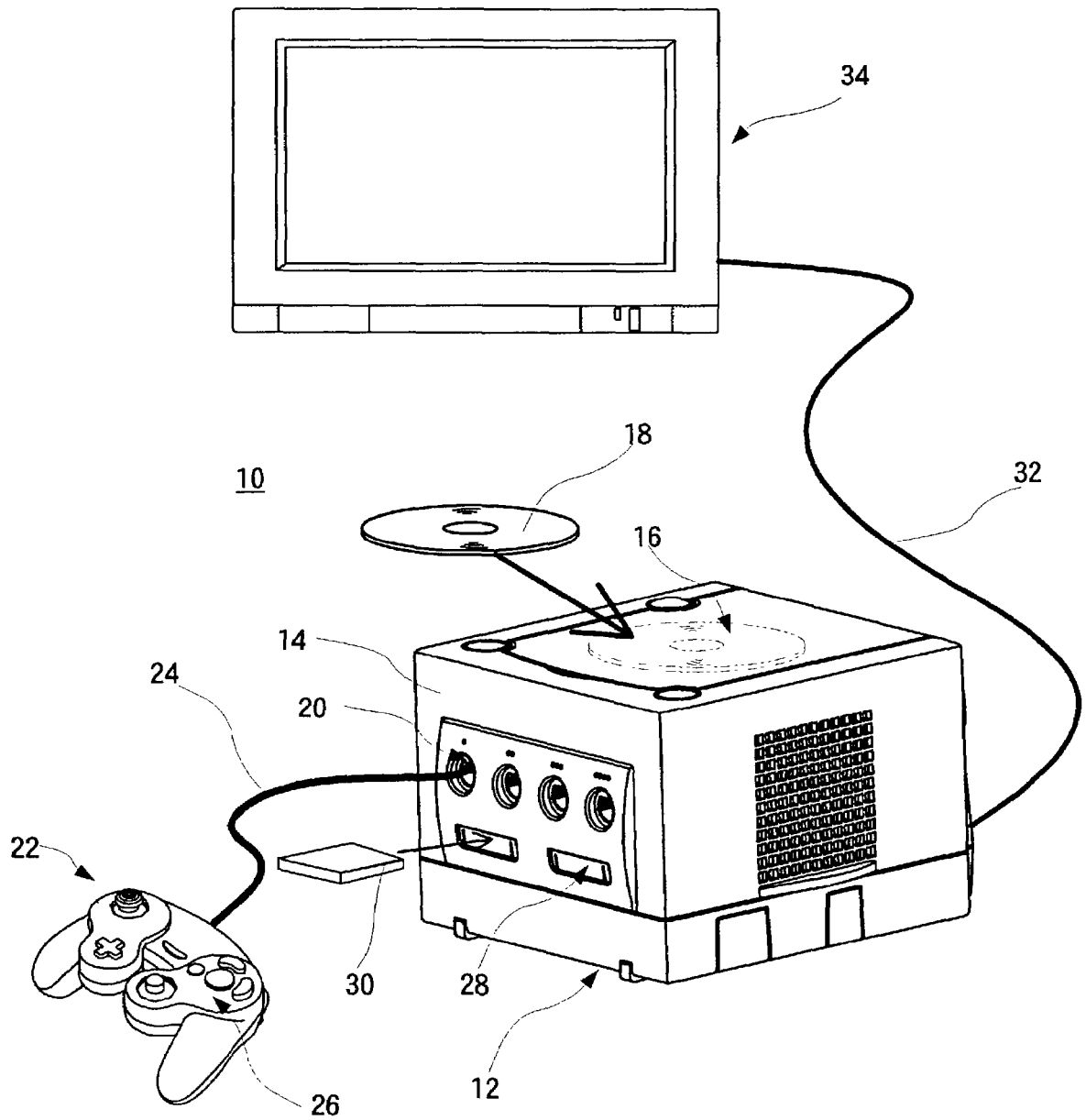
FIG. 1 is an illustrative view showing a game system of one non-limiting exemplary embodiment of the present invention.

A video game system 10 of an embodiment shown in FIG. 1 includes a video game machine (hereinafter, may simply be referred to as "game machine") 12. Although a power source is applied to the game machine 12, a general AC adapter (not shown) may be applied thereto in this embodiment. The AC adapter is inserted to a standard wall socket for home use, and a power source for home use is converted to a low DC voltage signal suitable for driving the game machine 12. In another embodiment, a battery may be utilized as the power source.

The game machine 12 includes an approximately cubic housing 14, and the housing 14 is provided with an optical disk drive 16 on an upper surface thereof. An optical disk 18 which is one example of an information recording medium stored with a game program is loaded on the optical disk drive 16. The housing 14 is provided with a plurality of connectors 20 (four in this embodiment) on a front surface thereof. These connectors 20 are for connecting a controller 22 to the game machine 12 by a cable 24 and can connect up to four controllers to the game machine 12 in this embodiment.

The controller 22 is provided with an operating mechanism (control) 26 on upper, lower and lateral sides thereof. The operating mechanism 26 includes, for example, two analog joysticks, one cross key, a plurality of button switches and so on. One analog joystick is utilized for inputting a moving direction and/or a moving speed, moving amount and etc. of a player character (a moving image character operable by the controller 22 by the player) according to an amount of inclination and a direction of the stick. Other analog joystick is utilized for controlling movement of the virtual camera according to a direction of an inclination thereof. The cross key is utilized for instructing a moving direction of the player character in place of the analog joystick. The button switches are utilized for instructing movement of the player character, switching a point of view of the virtual camera in the three-dimension image, adjusting the moving speed of the player character and etc. The button switches furthermore control, for example, a menu selection and movement of a pointer or a cursor.

It is noted that the controller 22 is connected to the game machine 12 by the cable 24 in this embodiment. However, the controller 22 may be connected to the game machine 12 via an electromagnetic wave (for example, radio wave or infrared ray) in a wireless manner. Furthermore, detailed structure of the operating mechanism 26 of the controller 22 is, of course, not limited to the structure of the embodiment and can be arbitrarily changed or modified. For example, the only one analog joystick may be utilized or no analog joystick may be utilized. The cross switch may not be utilized.

At least one (two in this embodiment) memory slot 28 is provided below the connectors 20 on the front surface of the housing 14 of the game machine 12. A memory card 30 is inserted to this memory slot 28. The memory card 30 is utilized for loading the game program and display data (see FIG. 3) read from the optical disk 18 so as to temporarily store, or saving game data (i.e., result of a game) of the game that the player plays by utilizing the game system 10.

The housing 14 of the game machine 12 is, on a rear surface thereof, provided with an AV cable connector (not shown) with which a monitor 34 is connected to the game machine 12 through an AV cable 32. The monitor 34 is typically a color television receiver, and the AV cable 32 inputs a video signal from the game machine 12 to a video input terminal of the color television and applies a sound signal to a sound input terminal. Accordingly, a game image of a three-dimension (3D) video game, for example, is displayed on the color television (monitor) 34, and a stereo game sound such as game music, a sound effect and etc. is output from right and left speakers.

In the game system 10, a user or a game player turns on an electric power source of the game machine 12 in order to play a game (or another application), and then, selects a suitable optical disk 18 storing a video game (or another application intended to play), and loads the optical disk 18 on the disk drive 16 of the game machine 12. In response thereto, the game machine 12 starts to execute the video game or another application on the basis of software stored in the optical disk 18. The user operates the controller 22 so as to apply an input to the game machine 12. For example, by operating any one of the operating mechanism 26, the game or another application is started. By moving another of the operating mechanism 26, it is possible to move the moving image character (player character) toward different directions and to change the point of eye of the user (camera position) in the three-dimension (3D) game world.

Figure 2:
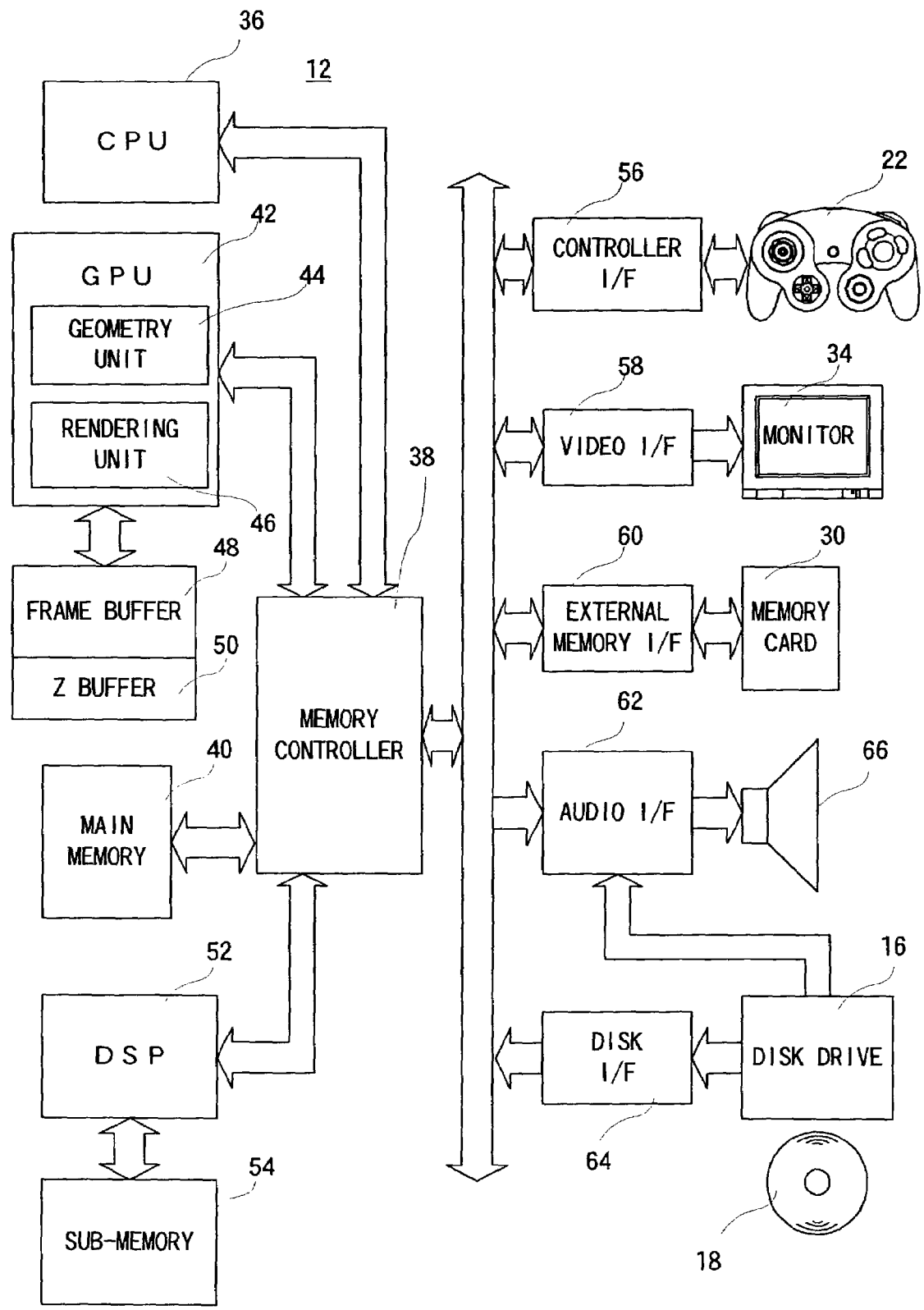
FIG. 2 is a block diagram showing in detail a game machine in FIG. 1 embodiment.

FIG. 2 is a block diagram showing a configuration of the video game system 10 of FIG. 1 embodiment. The video game machine 12 is provided with a central processing unit (hereinafter, may be referred to as "CPU") 36 for governing overall control of the game machine, and the CPU 36 is connected with a memory controller 38 via a bus. The memory controller 38 mainly controls writing and reading of a main memory 40 connected via a bus under control of the CPU 36. The memory controller 38 is coupled with a GPU (Graphics Processing Unit) 42.

The GPU 42 is constructed by, for example, a single chip ASIC and receives a graphics command (a construction command) from the CPU 36 via the memory controller 38 and then, in response to the command, generates the three-dimension (3D) game image by a geometry unit 44 and a rendering unit 46. Specifically, the geometry unit 44 performs a coordinate operation process such as turn-around or rotation, movement, transformation and etc. of a variety of characters and objects (which is formed by a plurality of polygons, and the polygon is a polygonal plane defined by at least three vertex coordinates) in a three-dimension coordinates system. The rendering unit 46 pastes (performs a rendering) a texture on each of polygons of the variety of objects. Accordingly, three-dimension image data to be displayed on the game screen is produced by the GPU 42, and the image data (texture data) is rendered (stored) in the frame buffer 48. It is noted that data (primitive or polygon, texture and etc.) desired to execute the construction command by the GPU 42 is acquired from the main memory 40 via the memory controller 38.

The frame buffer 48 is a memory for rendering (accumulating) the image data of one frame, for example, of the raster scan monitor 34 and is rewritten by the GPU 42 every one frame. A video I/F 58 described later reads the data stored in the frame buffer 48 through the memory controller 38, and whereby the 3D game image is displayed on the screen of the monitor 34. It is noted that a capacity of the frame buffer 48 largely corresponds to the number of pixels (or dots) of the screen to be displayed. For example, it has the number of pixels (storing positions or addresses) corresponding to the number of the pixels of the display or monitor 34.

Furthermore, a Z buffer 50 has a storage capacity equal to the number of pixels (storing positions or addresses) corresponding to the frame buffer 48×the number of bits of depth data per one pixel, and stores depth information or depth data (Z value) of dots corresponding to respective storing positions of the frame buffer 48.

It is noted that the frame buffer 48 and the Z buffer 50 may be constructed by a portion of the main memory 40.

The memory controller 38 is also connected to a sub memory 54 via a DSP (Digital Signal Processor) 52. Accordingly, the memory controller 38 controls the writing and/or the reading of the sub memory 54 besides the main memory 40.

The memory controller 38 is further connected to respective interfaces (I/F) 56, 58, 60, 62 and 64 by buses. The controller I/F 56 is an interface for the controller 22 and applies an operation signal or data of the operating mechanism 26 to the CPU 36 through the memory controller 38. The video I/F 58 accesses the frame buffer 48 to read the image data formed by the GPU 42 and then, applies the image signal or the image data (digital RGB pixel values) to the monitor 34 via the AV cable 32 (FIG. 1). The external memory I/F 60 makes the memory card 30 (FIG. 1) which is inserted to the front surface of the game machine 12 communicate to the memory controller 38. This allows the CPU 36 to write the data to the memory card 30 (FIG. 1) or read the data from the memory card 30 via the memory controller 38. The audio I/F 62 receives audio data applied from the frame buffer 48 through the memory controller 38 or an audio stream read from the optical disk 18, and then in response thereto applies an audio signal (sound signal) to a speaker 66 of the monitor 34. It is noted that in a stereo sound, the speaker 66 is provided right and left at least one. The disk I/F 64 connects the disk drive 16 to the memory controller 38, and whereby the CPU 36 controls the disk drive 16. The disk drive 16 writes program data, texture data and etc. read from the optical disk 18 to the main memory 40 under control of the CPU 36.

Figure 3:
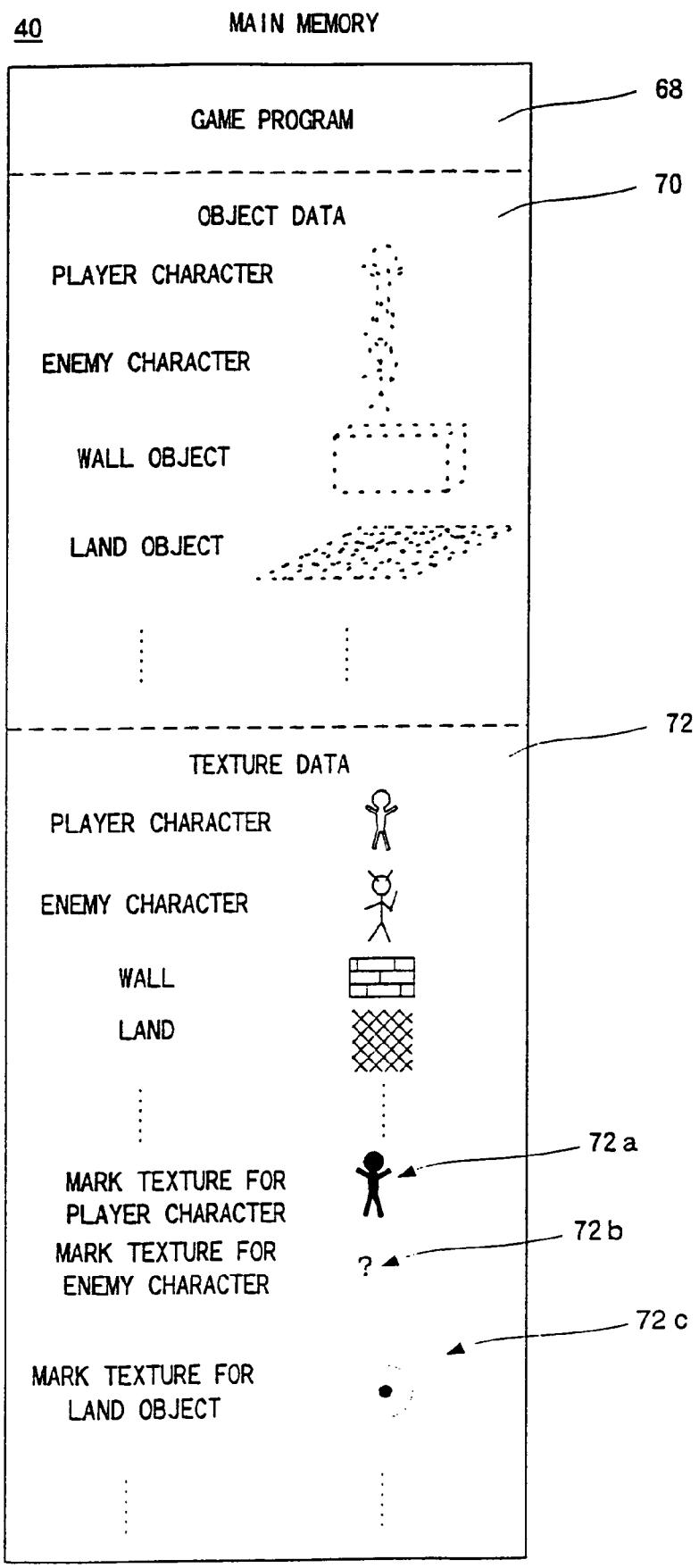
FIG. 3 is an illustrative view showing one example of a memory map of a main memory shown in FIG. 2.

FIG. 3 shows a memory map of the main memory 40. The main memory 40 includes a game program storage area 68, an object data storage area 70 and a texture data storage area 72. The game program storage area 68 is stored with the game program read from the optical disk 18 wholly at one time, or partially and sequentially.

The object data storage area 70 is loaded with game characters such as a player character, an enemy character and etc., geometry objects such as a wall (building) object, a land object and etc., and item objects such as an item and etc. It is noted that each object is formed by polygons. The data such as the above-described characters, the objects and etc. may be loaded into the main memory 40 from the optical disk 18 as necessary.

The texture data storage area 72 is stored with mark textures 72a, 72b and 72c utilized in the embodiment besides the texture data for the above-described player character, the enemy character, the wall object, the land object and etc. The mark texture 72a is a mark texture, when the player character hides behind the wall object on the game screen, for notifying the player that the player character exists at the backside of the wall object. Similarly, the mark texture 72b is a mark texture, when the enemy character or the item hides behind any object on the game screen, for informing the player that the enemy character or the item is present at the backside of the object. In addition, the mark texture 72c is, when indicating presence of the player character hidden behind the object by the above-described mark texture 72a, in a case the player character is present on a land or a floor at the backside of the object, a texture displayed together with the player character as a mark of the land.

When playing the game, the optical disk 18 is set in the game machine 12 and the power source is turned on as described above, the data is read from the optical disk 18 and then, required data is stored into the main memory 40 as shown in FIG. 3.

Figure 4:
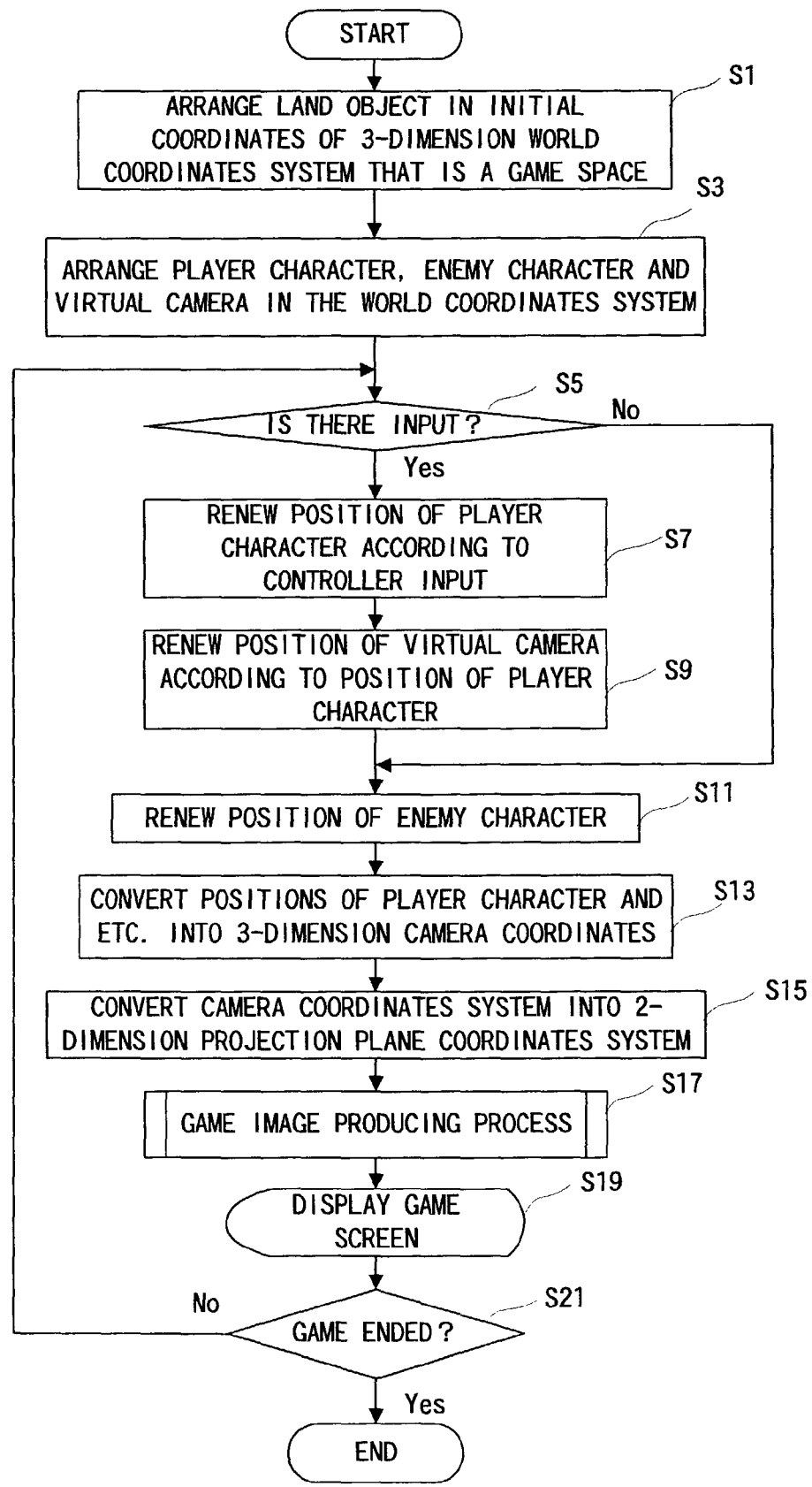
FIG. 4 is a flowchart showing an operation of FIG. 1 embodiment.
Figure 5:
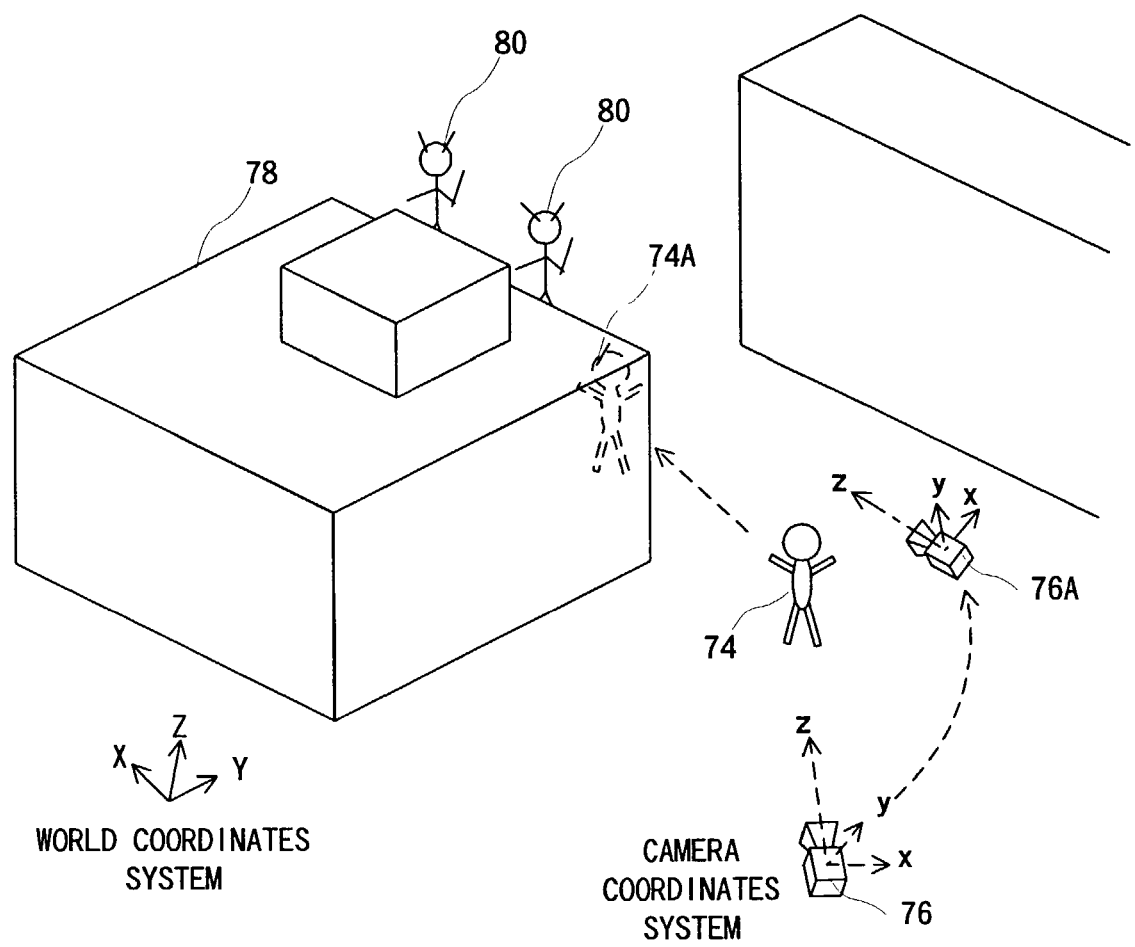
FIG. 5 is an illustrative view showing a world coordinates system and a camera coordinates system.

Then, in a first step S1 shown in FIG. 4, the CPU 36 reads data of the geometry object (land object, building object, wall object and etc.) and item from the object data storage area 70 of the main memory 40 and arranges the geometry objects and the items in initial coordinates of the three-dimension world coordinates system, i.e., in the game space as shown in FIG. 5. Next, in a step S3, the CPU 36 reads data of the player character, the enemy character and the virtual camera from the object data storage area 70 so as to arrange the same in the initial coordinates of the world coordinates system.

In a step S5, the CPU 36 determines whether or not the operating mechanism 26 (FIG. 1) of the controller 22 is operated, i.e., whether or not an input from the controller 22 via the controller I/F 56 and the memory controller 38 is present.

If the controller input is present, the CPU 36 changes a position of the player character in the world coordinates system in response to the controller input in a step S7. The player or the user, in a case of changing the position of the player character 74 shown in FIG. 5, operates, for example, the analog joystick (or 3D joystick) among the operating mechanism 26 (FIG. 1) of the controller 22. Accordingly, in the step S7, the CPU 36 receives, for example, data of the direction of the inclination and the amount of the inclination of the joystick from the controller I/F 56 and renews the position of the player character 74 on the basis of the data.

In a next step S9, the CPU 36 renews the position of the virtual camera in the world coordinates system according to the position of the player character renewed in the step S7. That is, the step S9 is a step to execute a so-called "turn-around process" of the virtual camera.

Assuming a case that the player character 74 is moved from a position indicated by "74" to a position indicated by "74A" as shown in FIG. 5 with an operation of the controller by the user. In this case, the moved player character 74A is viewed from the virtual camera 76 at an original position. Therefore, the player character 74A hides behind the building object 78, and if it leaves as it is, the player character 74A is not displayed on the game screen. In such a case, in the step S9, the virtual camera 76 is moved to a position from which the player character 74A can be viewed, i.e., to a position indicated by "76A" from a position indicated by "76" so that the player character 74A can be displayed on the game screen. That is, the position of the virtual camera is changed according to the position of the player character.

Thereafter, as in the case of absence of the controller input, the CPU 36 renews a position of the enemy character 80 (FIG. 5) in the world coordinates system in a step S11. The position of the enemy character 80 needs to be renewed irrespective of the operation of the controller 22, and therefore, the step S11 is executed at this time.

In a step S13, the CPU 36 converts the positions of the above-described geometry object, the building object, the item, the player character, the enemy character and etc. into a three-dimension camera coordinates system making the virtual camera 76 (76A) as a reference.

Thereafter, in a step S15, the CPU 36 converts the three-dimension camera coordinates system to a two-dimension projection plane coordinates system and executes a designation of the texture, clipping (cut-off of invisible world) and etc. in addition.

Then, in a step S17, a game image producing process is executed. As to the step S17, a detailed description will be made later.

After producing a game image as described later in the step S17, a game screen is displayed on the monitor 34 (FIG. 1) in a step S19. Specifically, the CPU 36 applies an instruction to the video I/F 58, and in response thereto, the video I/F 56 accesses the frame buffer 48 (FIG. 2). Accordingly, image data to be displayed on the monitor 34 is read from the frame buffer 48, and a game image can be displayed.

Thereafter, it is determined whether or not the game is ended in a step S21. If the game is ended, a FIG. 4 routine is directly ended, while in a case the game is continued, the process is returned to the previous step S5 and waits an input from the controller 22.

Figure 6:
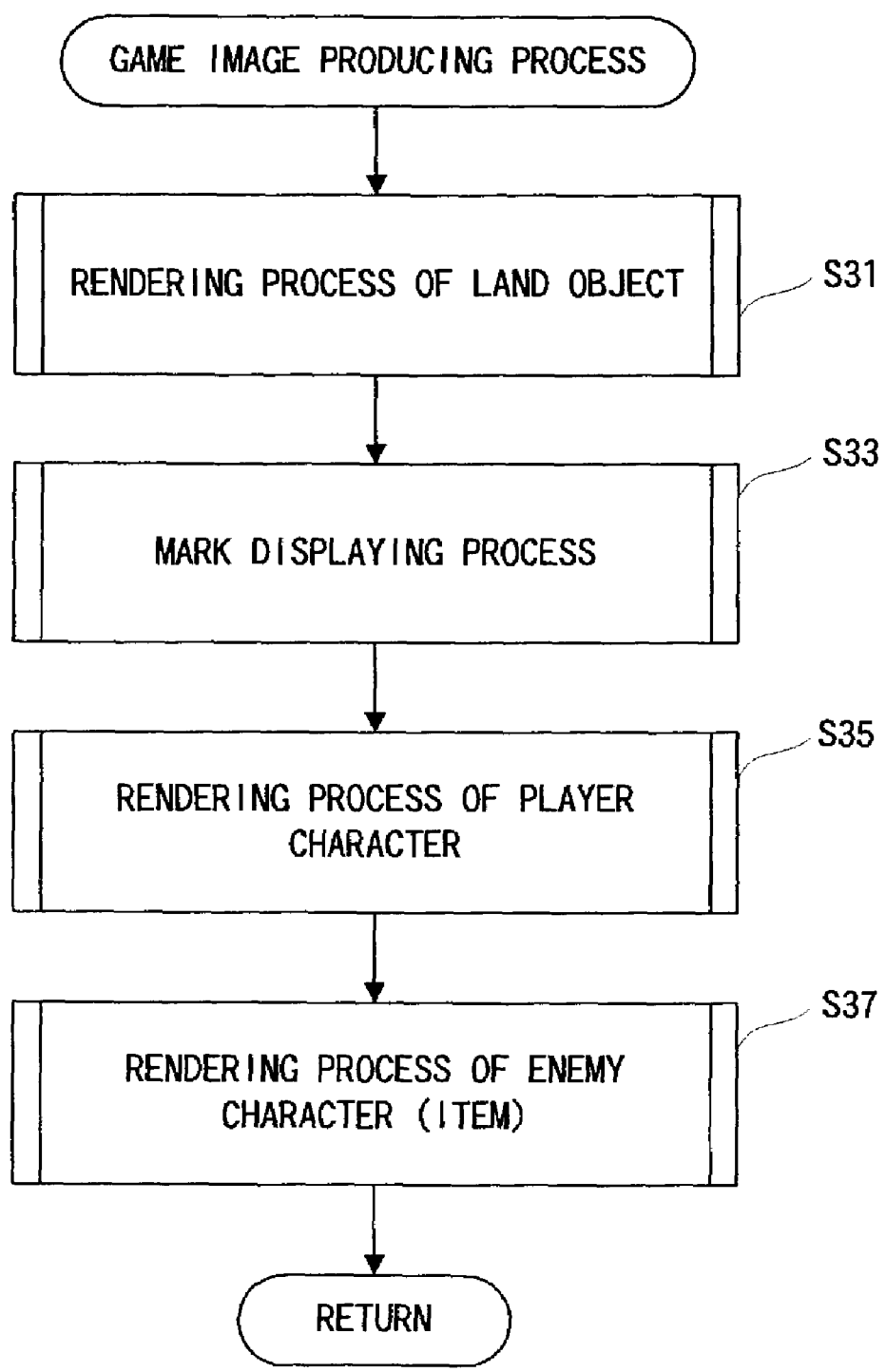
FIG. 6 is a flowchart showing an operation of a game image producing process shown in FIG. 4.

Referring to FIG. 6, a game image producing process routine in the step S17 of FIG. 4 is shown. The CPU 36 (FIG. 2) executes a rendering process of the geometry object in a first step S31 shown in FIG. 6 and sequentially executes a mark displaying process, a rendering process of the player character, and a rendering process of the enemy character (and item) in following steps S33, S35, and S37, respectively.

Figure 7:
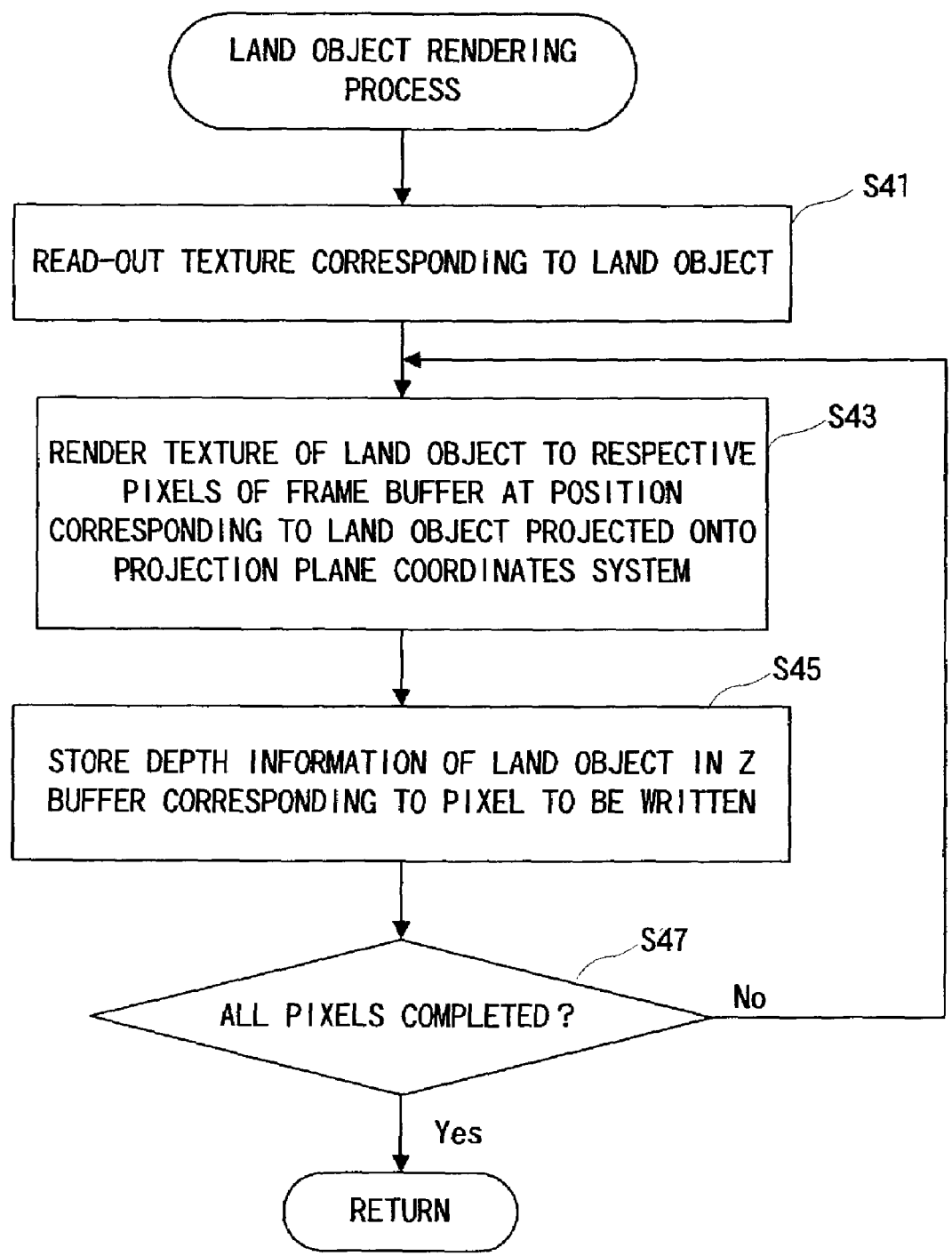
FIG. 7 is a flowchart showing an operation of a rendering process of a geometry object and etc. shown in FIG. 6.

The geometry object rendering process routine in the step S31 will be described in detail in FIG. 7. In a first step S41 in FIG. 7, the CPU 36 reads texture data corresponding to the geometry object such as the wall object, the land object and etc. from the texture data storage area 72 of the main memory 40 (FIG. 2 and FIG. 3).

Then, in a next step S43, the CPU 36 renders the texture of the geometry object to respective pixels of the frame buffer 48 (FIG. 2) at a position corresponding to the geometry object (wall object, land object and etc.) projected onto the two-dimension projection plane coordinates system converted in the step S15 (FIG. 4). That is, color information of the geometry object is written to storage positions corresponding to the respective pixels of the frame buffer.

In a next step S45, the CPU 36 writes the depth information (Z value) of the geometry object to the storage position of the Z buffer 50 (FIG. 2) corresponding to the current pixel.

The above-described steps S43 and S45 are repeatedly executed until the completion of all pixels is detected in a step S47, and if the rendering process of all pixels on the display screen of the monitor 34 is completed, the process returns to the step S33 shown in FIG. 6 so as to proceed to a mark displaying process routine S33.

Figure 8:
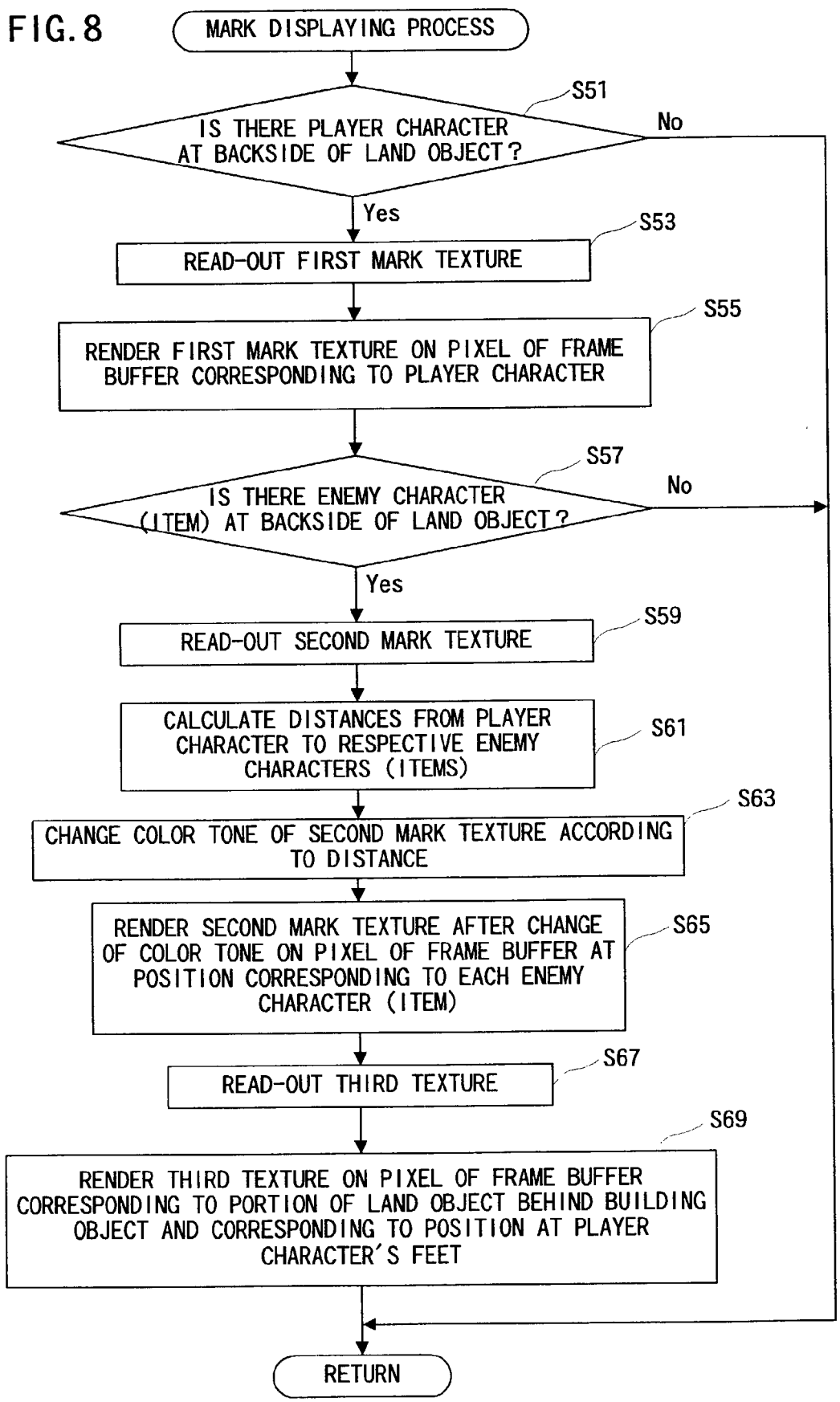
FIG. 8 is a flowchart showing an operation of a mark displaying process shown in FIG. 6.

The detailed description of the mark displaying process routine in the step S33 is shown in FIG. 8. In a first step S51 shown in FIG. 8, the CPU 36 determines whether or not the player character viewed from the virtual camera (a point of view) hides behind the geometry object. For example, in a case an approximately sphere is arranged at an arrangement position of the player character and more than one-third of an area of the sphere is covered with the geometry object, it is determined the player character hides behind the geometry object. More specifically, a Z value of a pixel (herein, approximately sphere) into which the player character is rendered is compared with a Z value of the geometry object in a pixel corresponding to the frame buffer 48, that is, a so-called Z test is executed. It is examined whether or not the player character is located at the front side of the object or the backside thereof every pixel within the frame buffer. As a result of the Z test, it is determined whether or not the player character is at the backside of the geometry object in the step S51. Consequently, the step S51 is equal to a first determination mechanism.

Figure 9:
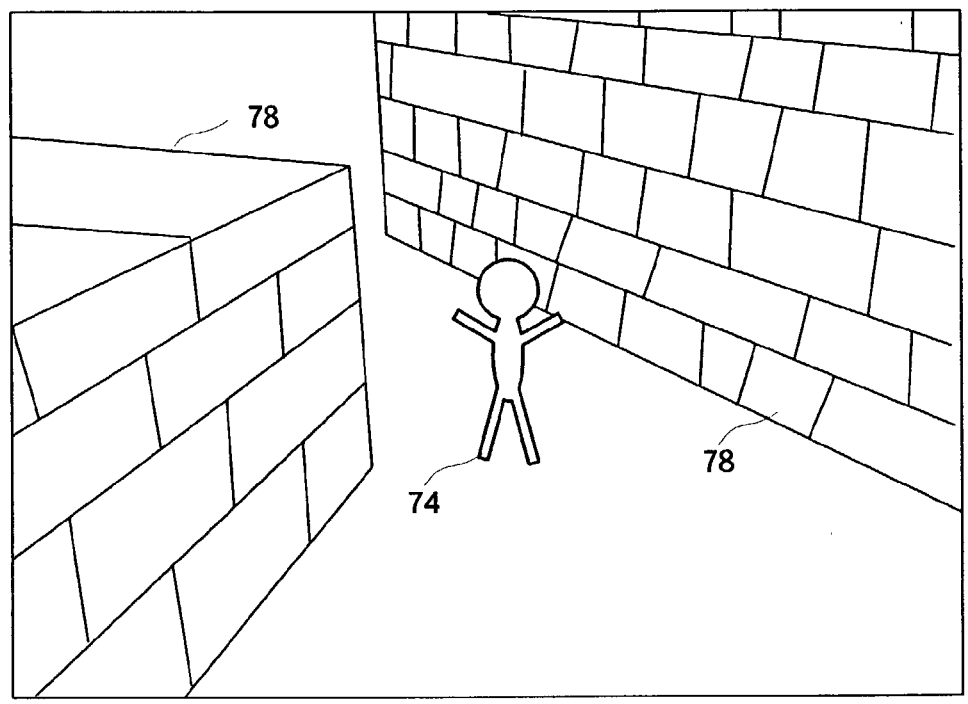
FIG. 9 is an illustrative view showing one example of a game screen in a state a player character does not hide behind the object.

That "NO" is determined in the step S51 mechanism the player character 74 is not at the backside of any geometry object (wall object 78 in FIG. 9) as shown in FIG. 9, and in this case, the process is directly returned to the step S35 (FIG. 6).

Figure 10:
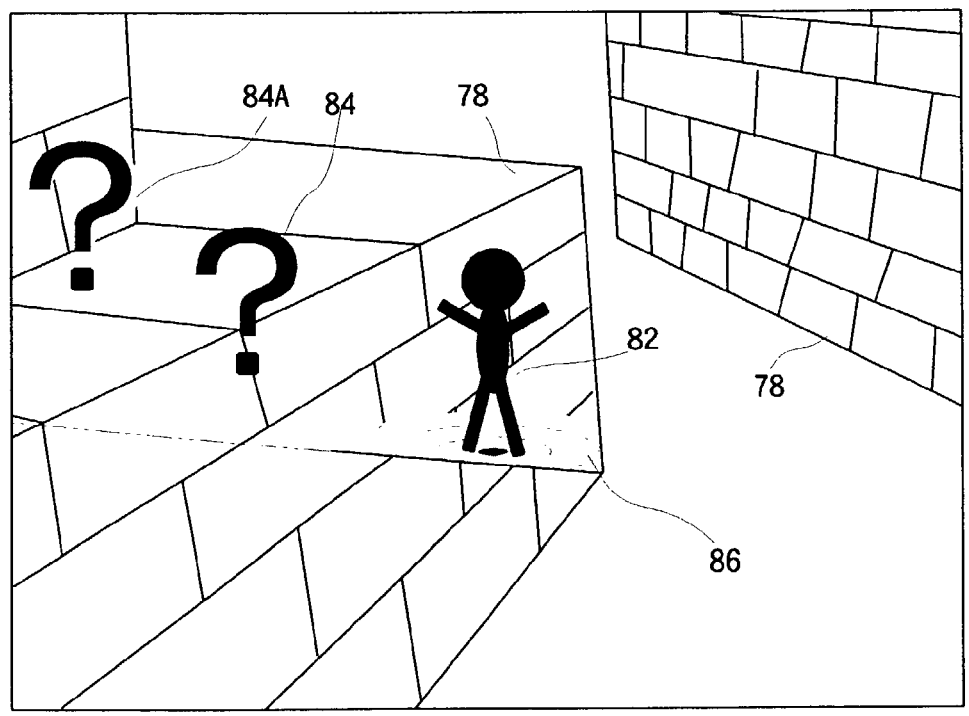
FIG. 10 is an illustrative view showing one example of a game screen in a state the player character hides behind the object.
Figure 11:
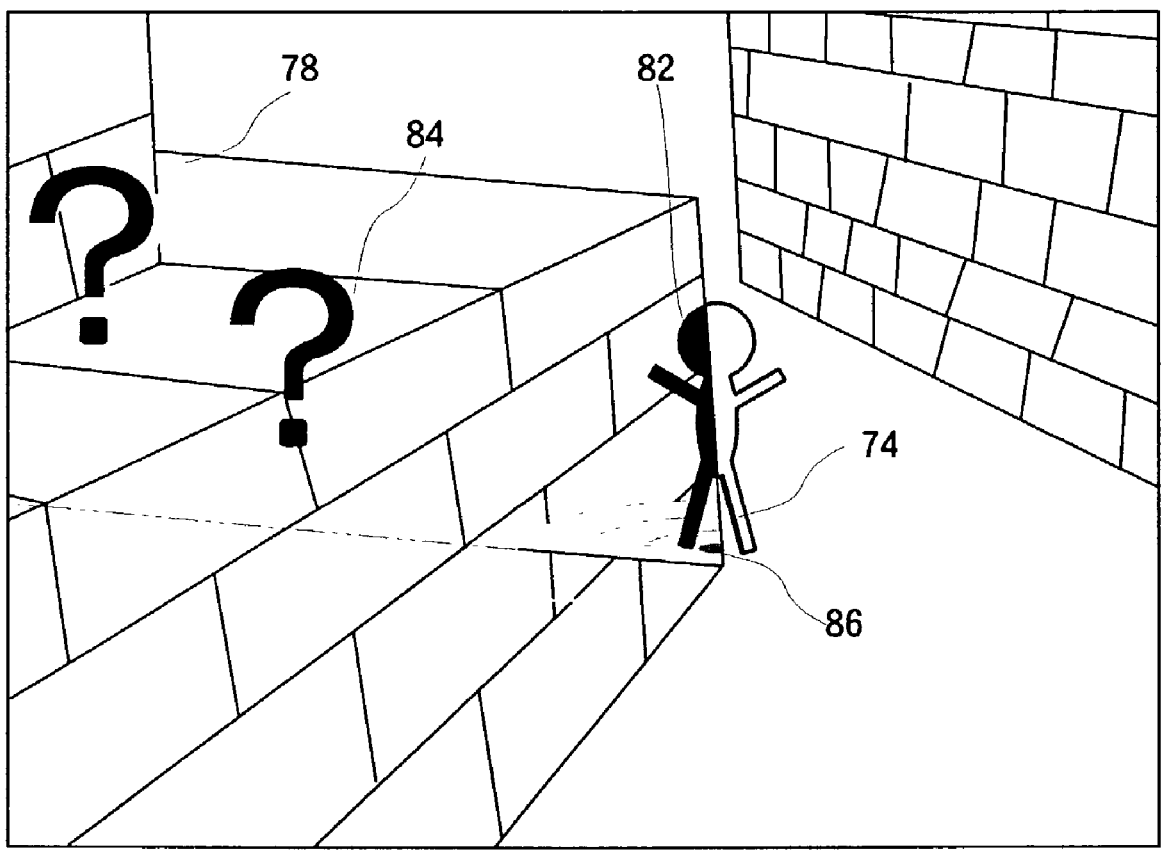
FIG. 11 is an illustrative view showing one example of a game screen in a state one half of the player character hides behind the object and other half does not hide behind the object.

If "YES" is determined in the step S51, the player character 74 is in a state of hiding behind the wall object 78 as shown in FIG. 10, for example. If in this state in a prior art, the turn-around process of the virtual camera described above is performed in a state the player character hides behind the object. Accordingly, there is a possibility that the player loses sight of presence of the player character until the turn-around process by the virtual camera is performed. On the other hand, such the turn-around process gives a feeling of strangeness as to the moving direction of the player character to the player.

In contrast thereto, when the player character 74 hides behind the geometry object 78 in this embodiment, a first mark 82 (a specific-shaped symbol in order to inform the player of a state that the player character hides behind the object) shown in FIG. 10 is displayed on the game screen. This informs the player or user of a state of gameplay in which the player character gets under cover. Accordingly, the player can understand the state that the player character hides behind the object on the basis of the display of the first mark 82. Therefore, it is possible to immediately continue the game without any feeling of strangeness.

To this end, in a step S53, the CPU 36 reads data of the texture 72a of the first mark 82 from the texture data storage area 72 of the main memory 40. The first mark 82 is a simple color character having the same shape as the player character in this embodiment. It is noted that it is needless to say that such the first mark 82 may be a symbol in an arbitrary shape, and the shape and the texture may be arbitrarily set similarly to a second mark 84 and a third mark 86 described later.

Next, in a step S55, the CPU 36 renders the first mark texture 72a on respective pixels of the frame buffer corresponding to the shape of the player character while ignoring the Z values of respective pixels of the geometry object rendered in the Z buffer 50 (FIG. 2), i.e., without renewing the Z values of the pixels. Thus, by ignoring (not renewing) the Z values in the respective pixels, the geometry object image and the first mark image becomes an integral image, and in a case the first mark image is closer to a side of the virtual camera than that of the geometry object, the image is rewritten or overwritten, and in a contrary case, the image is not rewritten or overwritten according to the Z test thereafter. That is, when the player character is at the backside of the geometry object, a regular texture of the player character is not overwritten, and therefore, the first mark image is left. On the other hand, when the player character is at the front side of the geometry object, the regular texture of the player character is overwritten. Thus, it is possible to realize a display manner in which one half of the player character which is not hidden by the object is displayed by the regular texture of the player character and other half of the player character which is hidden by the wall object 78 is displayed by the first mark texture, as to a shape of one player character.

In a step S57 corresponding to the second determination mechanism, the CPU 36 executes the Z test again and compares the arrangement positions between the enemy character and/or the item viewed from the virtual camera (the point of view) and the geometry object. By the Z test, it is determined whether or not the enemy character and/or the item is located at the front side of the geometry object or at the backside thereof every pixel. As a result of the Z test, it is determined whether or not the player character is at the backside of the geometry object in the step S51. That "NO" is determined in the step S57 mechanism the enemy character or the item is not at the backside of any geometry object, and in this case, the process is directly returned to the step S35 (FIG. 6).

If "YES" is determined in the step S57, it is in a state that the enemy character or the item is at the backside of the wall object 78, for example. In this state in a prior art, the enemy character or the item remains at the backside of the geometry object, and thereafter, the enemy character or the item suddenly appears. On the contrary, when the enemy character or the item is at the backside of the wall object 78 in this embodiment, the second mark (a specific-shaped symbol in order to inform the player of a state that the enemy character or the item is at the backside of the object) 84 shown in FIG. 10 is displayed on the game screen. This informs the player or the user of a state that the enemy character and/or the item are at the backside of the object. Accordingly, the player can understand the state that the enemy character and etc. gets under cover on the basis of the display of the second mark 84. Therefore, it is possible to immediately continue the game.

More specifically, in a following step S59, the CPU 36 reads data of the texture 72b for the second mark 84 from the texture data storage area 72 of the main memory 40. The second mark 84 is a mark to inform the player that the enemy character 80 (FIG. 5) or the item (not shown) is at the backside of the geometry object and has a specific shape and/or a texture. In this embodiment, the second mark texture 84 is a simple color character and has a question mark (?) shape in English.

Thereafter, in a step S61, the CPU 36 calculates distance between the player character and the enemy character and/or the item in the projection plane coordinates system. Then, in a step S63, the CPU 36 changes a color tone of the second mark 84 according to the distance. Then, in a step S65, the CPU 36 ignores the Z values similarly to the step S57 and renders a second mark texture (and a texture having the changed color tone) into the frame buffer at the position corresponding to the enemy character and/or the item. Accordingly, referring to FIG. 10, for example, a dark colored question mark (?), i.e., the second mark 84 is displayed at a position of the enemy character or the item being closer to the first mark 82 for the player character while a light colored second mark 84A is displayed at a position of the enemy character or the item being away from the first mark 82. Thus, by changing the color tone of the second mark 84 according to the distances from the player character, the player can know in advance a plurality of enemy characters or items are at the backside of the geometry object and distances between the player character and individual enemy characters or items are different. Accordingly, fear or surprise caused by an appearance of the enemy character from the backside is not given to the player.

Next, in a step S67, the CPU 36 reads data of the texture 72c for a third mark 86 (FIG. 10) from the texture data storage area 72 of the main memory 40. The third mark 86 is a mark to indicate that the player character being at the backside of the geometry object exists on the land or the floor and is a symbol of fourfold circle with gradations in this embodiment. It is noted that the third mark 86 is arbitrarily changeable in shape and texture.

Finally, in a step S69, the read third mark texture 72c is rendered at a position of the player character's feet without renewing the Z value. Thus, the first mark 82 for the player character is displayed in a state it stands on the third mark 86 for the land at the backside of the wall object 78 as shown in FIG. 10. Accordingly, the player or user can know that the player character is at the backside of the wall object 78 on the land object by viewing the game screen at that time shown in FIG. 10.

It is noted that in a case that the above-described steps S51 and S57 in FIG. 8 are provided, there is a possibility that the steps S53, S55, S59 to S69 may not be executed, and therefore, it is possible to reduce the load of processing. On the other hand, even if the steps S51 and S57 are not provided, by executing the steps S54 and S55 the first mark image can be displayed and by executing the steps S59 to S69 the second mark image and the third mark image can be displayed. That is, the step S51 and/or the step S57 may be omitted in FIG. 8.

Figure 12:
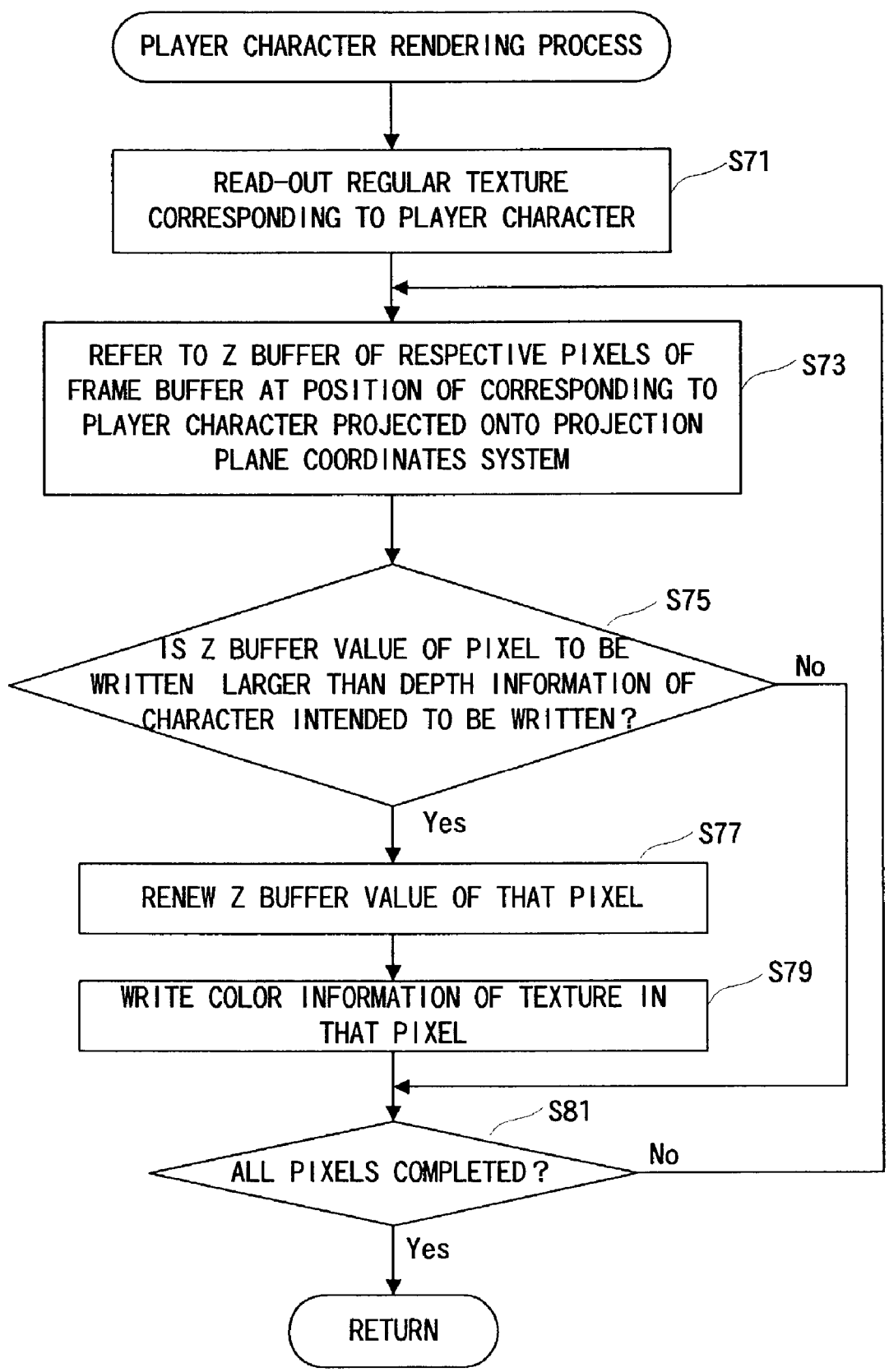
FIG. 12 is a flowchart showing an operation of a rendering process of the player character shown in FIG. 6.

The rendering process routine of the player character in the step S35 (FIG. 6) is described in detail in FIG. 12. In a first step S71 in FIG. 12, the CPU 36 reads texture data corresponding to the player character from the texture data storage area 72 of the main memory 40 (FIG. 2 and FIG. 3).

Then, in a following step S73, the CPU 36 refers to the Z values of respective pixels of the Z buffer 50 (FIG. 2) at positions of corresponding to the player character projected onto the two-dimension projection plane coordinates system converted in the step S15 (FIG. 4). Then, in a next step S75, the CPU 36 determines whether or not the Z value of the pixel to be written is larger than the depth information (Z value) of the player character intended to be written. That is, it is determined whether or not the player character is to be rendered. Accordingly, if "NO" is determined in the step S75, the process directly proceeds to a step S81.

If "YES" is determined in the step S75, the Z value (Z buffer) of that pixel is renewed in a following step S77, and the texture (color information) of the player character is rendered in that pixel in a step S79. Then, the above-described steps S73 to S79 are repeatedly executed until completion of all pixels is detected in a next step S81, and if the rendering process of all pixels is completed on the display screen of the monitor 34, the process returns to the step S37 shown in FIG. 6 so as to execute the rendering process routine of the enemy character (and item).

Figure 13:
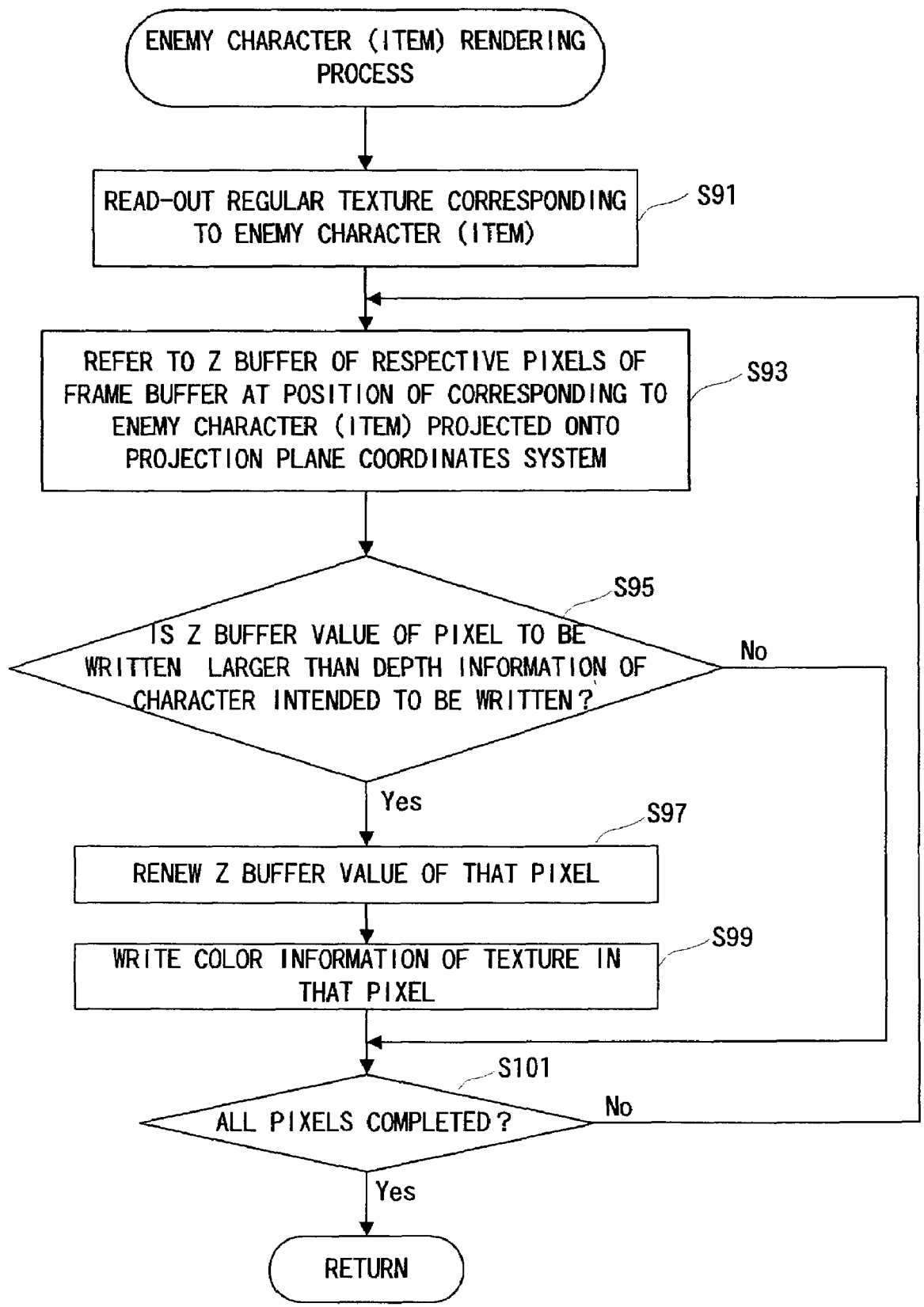
FIG. 13 is a flowchart showing an operation of a rendering process of an enemy character (or item) shown in FIG. 6.

The rendering process routine of the enemy character (and/or item) shown in the step S37 (FIG. 6) is described in detail in FIG. 13. In a first step S91 shown in FIG. 13, the CPU 36 reads texture data corresponding to the enemy character (and item) from the texture data storage area 72 of the main memory 40 (FIG. 2 and FIG. 3).

Then, in a next step S93, the CPU 36 refers to the Z values of respective pixels of the Z buffer 50 (FIG. 2) at positions corresponding to the enemy character (item) projected onto the two-dimension projection plane coordinates system. Then, in a following step S95, the CPU 36 determines whether or not the Z value of the pixel to be written is larger than the depth information (Z value) of the enemy character (item) intended to be written. That is, it is determined whether or not the enemy character or the item is to be rendered. Accordingly, if "NO" is determined in the step S95, the process directly proceeds to a step S101.

If "YES" is determined in the step S95, the Z value (Z buffer) of that pixel is renewed in a step S97, and the texture (color information) of the enemy character (item) is rendered in that pixel in a step S99. Then, the above-described steps S93 to S99 are repeatedly executed until completion of all pixels is detected in the next step S101, and if the rendering process of all pixels on the display screen of the monitor 34 is completed, the process returns to the step S19 shown in FIG. 4.

Although the non-limiting exemplary embodiments of the present invention has been described and illustrated in detail, it is clearly understood that the same is by way of illustration and example only and is not to be taken by way of limitation, the spirit and scope of the present invention being limited only by the terms of the appended claims.

What is claimed is:

1. A game machine for displaying at least a geometry object and a player character in a game space on the basis of a virtual camera arranged in said game space, comprising:
    a position determination mechanism for determining positions of said player character and said virtual camera in said game space in response to an operation of the player;
    a game image producing mechanism for producing a game image in which said geometry object and said player character are viewed from said virtual camera at a determined position; and
    a first mark image rendering mechanism for rendering a first mark image on an image of said geometry object in said game image without rewriting depth information from the virtual camera in a Z buffer so that at least a position of said player character can be known when said player character hides behind said geometry object.

2. A game machine for displaying at least a geometry object and a player character in a game space on the basis of a virtual camera arranged in said game space, comprising:

a position determination mechanism for determining positions of said player character and said virtual camera in said game space in response to an operation of the player;

a geometry object rendering mechanism for rendering said geometry object by a geometry object image in a frame buffer while writing depth information from said virtual camera to said geometry object in a Z buffer;

a first mark image rendering mechanism for rendering said player character by a first mark image in said frame buffer without rewriting the depth information of said Z buffer; and a player character rendering mechanism for rendering said player character by a player character image into said frame buffer while rewriting the depth information of said Z buffer when said player character is closer to the side of said virtual camera than that of said geometry object with referring to the depth information of said Z buffer.

3. A game machine for displaying at least a geometry object and a player character in a game space on the basis of a virtual camera arranged in said game space, comprising:

a position determination mechanism for determining positions of said player character and said virtual camera in said game space in response to an operation of the player;

a game image producing mechanism for producing a game image in which said geometry object and said player character are viewed from said virtual camera at a determined position;

a first determination mechanism for determining whether or not said player character hides behind said geometry object; and a first mark image rendering mechanism for rendering a first mark image indicative at least a position of said player character on an image of said geometry object in said game image in response to a determination of said first determination mechanism without rewriting depth information from the virtual camera in a Z buffer.

4. A game machine according to claim 1, wherein said geometry object includes at least a building object for displaying a building and/or a wall in said game space, said first mark image rendering mechanism renders the first mark image on an image of said building object in said game image when said player character hides behind said building object.

5. A game machine according to claim 1, wherein said first mark image includes a specific-shaped first symbol image.

6. A game machine according to claim 5, wherein said first symbol image has the same or similar to said player character in shape and a different from said player character in texture.

7. A game program storage device readable by a game machine, tangibly embodying a program of instructions executable by the game machine to make the game machine which displays at least a geometry object and a player character in a game space on the basis of a virtual camera arranged in the game space execute following steps of:

a position determination step for determining positions of said player character and said virtual camera in said game space in response to an operation of the player;

a game image producing step for producing a game image in which said object and said player character are viewed from said virtual camera at a determined position; and a first mark image rendering step for rendering a first mark image on an image of said geometry object in said game image without rewriting depth information from the virtual camera in a Z buffer such that at least a position of said player character can be known when said player character hides behind said geometry object.

8. A game program storage device readable by a game machine, tangibly embodying a program of instructions executable by the game machine to make the game machine which displays at least a geometry object and a player character in a game space on the basis of a virtual camera arranged in said game space execute following steps of:

a position determination step for determining positions of said player character and said virtual camera in said game space in response to an operation of the player;

a geometry object rendering step for rendering said geometry object by a geometry object image in a frame buffer while writing depth information from said virtual camera to said geometry object into a Z buffer;

a first mark image rendering step for rendering said player character by a first mark image in said frame buffer without rewriting the depth information of said Z buffer; and a player character rendering step for rendering said player character by said player character image in said frame buffer while rewriting the depth information of said Z buffer when said player character is closer to the side of said virtual camera than that of said geometry object with referring to the depth information of said Z buffer.

9. A game program storage device readable by a game machine, tangibly embodying a program of instructions executable by the game machine to make the game machine which displays at least a geometry object and a player character in a game space on the basis of a virtual camera arranged in said game space execute following steps of:

a position determination step for determining positions of said player character and said virtual camera in said game space in response to an operation of the player;

a game image producing step for producing a game image in which said object and said player character are viewed from said virtual camera at a determined position;

a first determination step for determining whether or not said player character hides behind said geometry object; and a first mark image rendering step for rendering a first mark image indicative at least a position of said player character on an image of said geometry object in said game image in response to a determination of said first determination step without rewriting depth information from the virtual camera in a Z buffer.

* * * * *